United States Patent Office 3,505,989
Patented Apr. 14, 1970

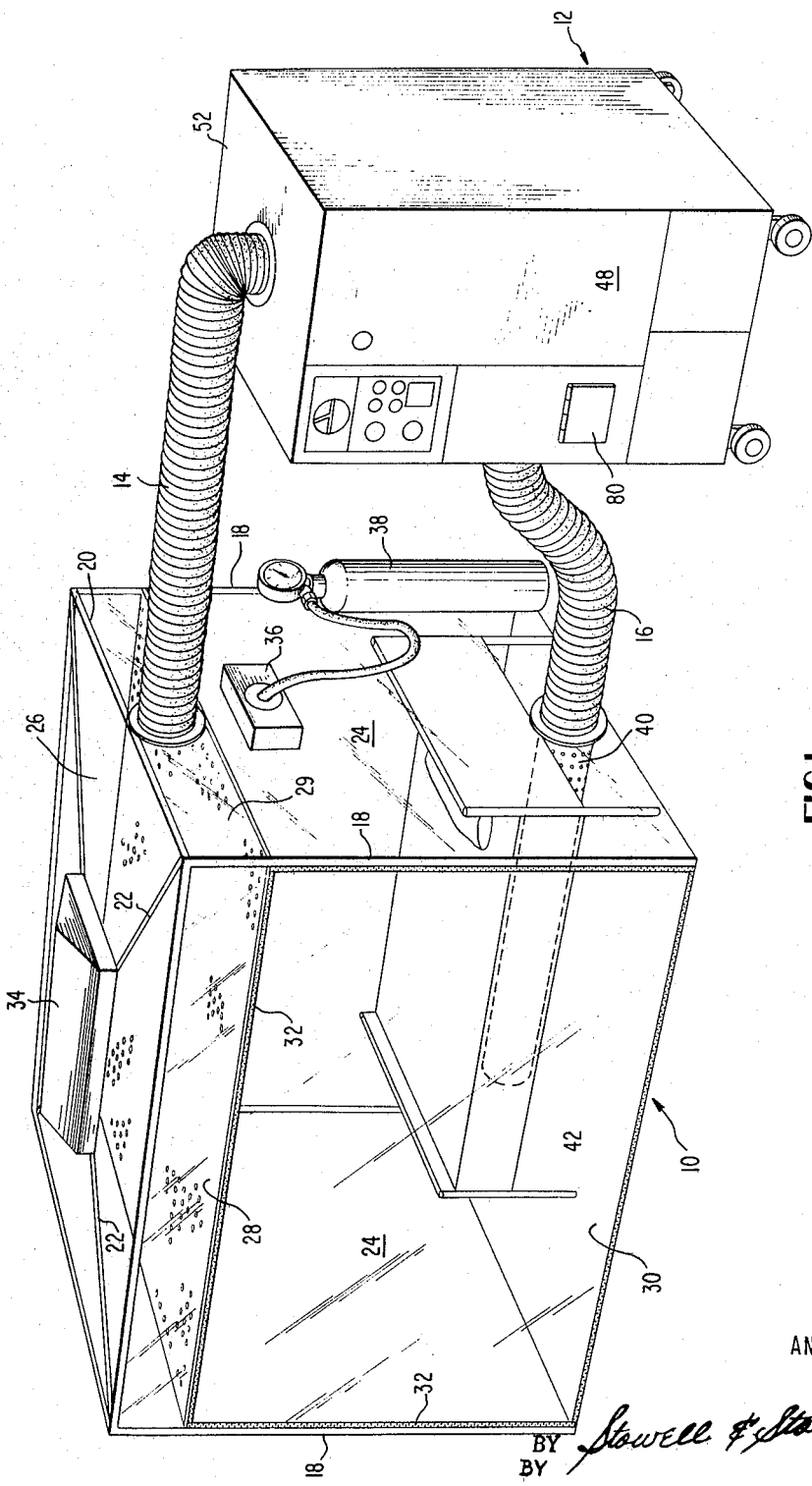

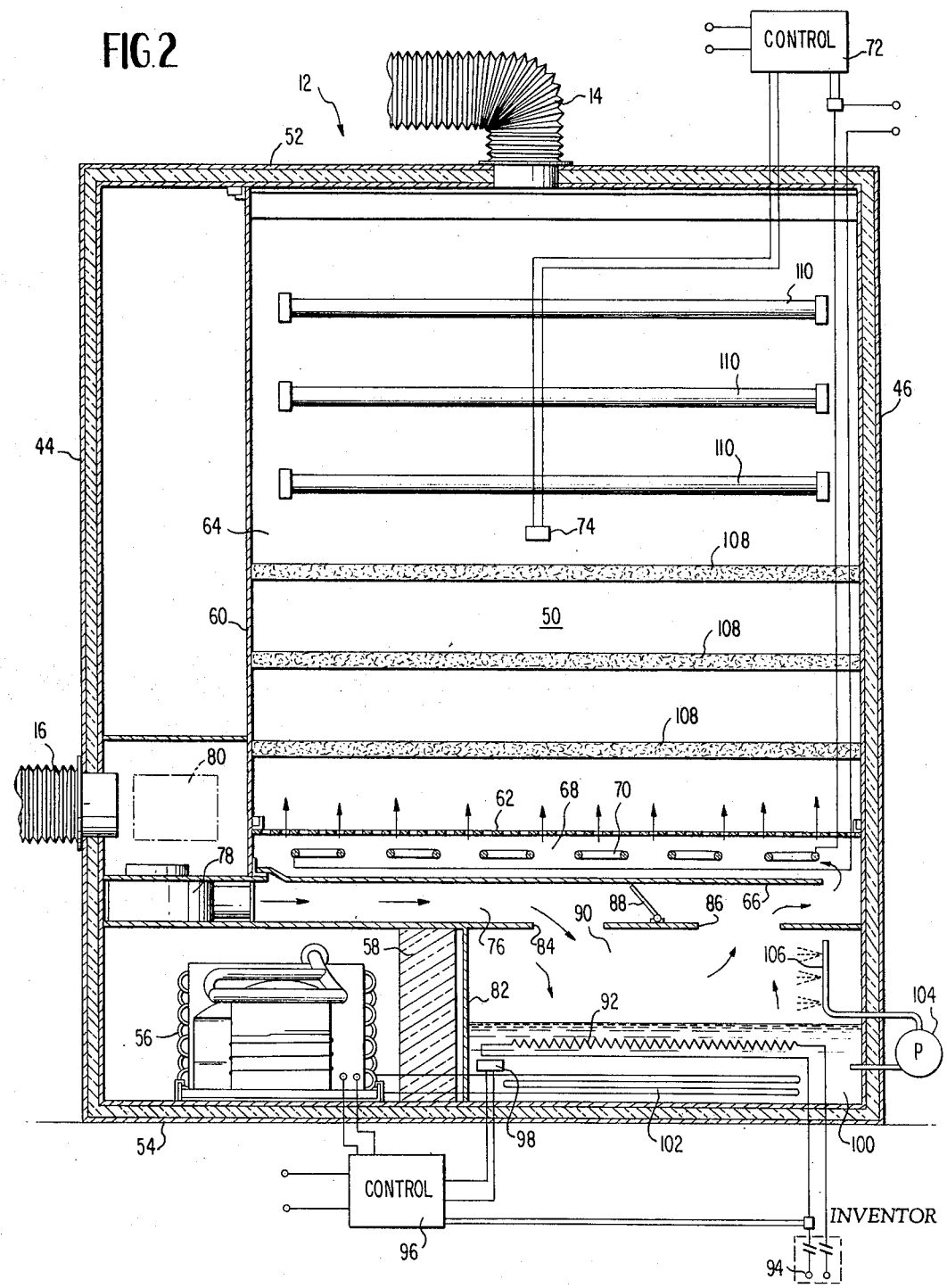

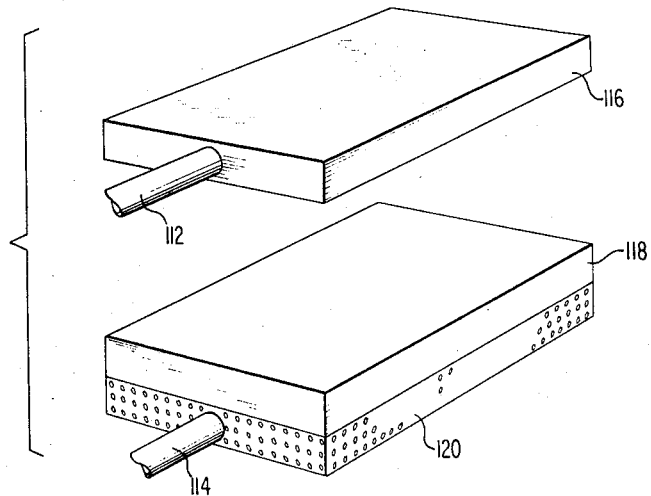
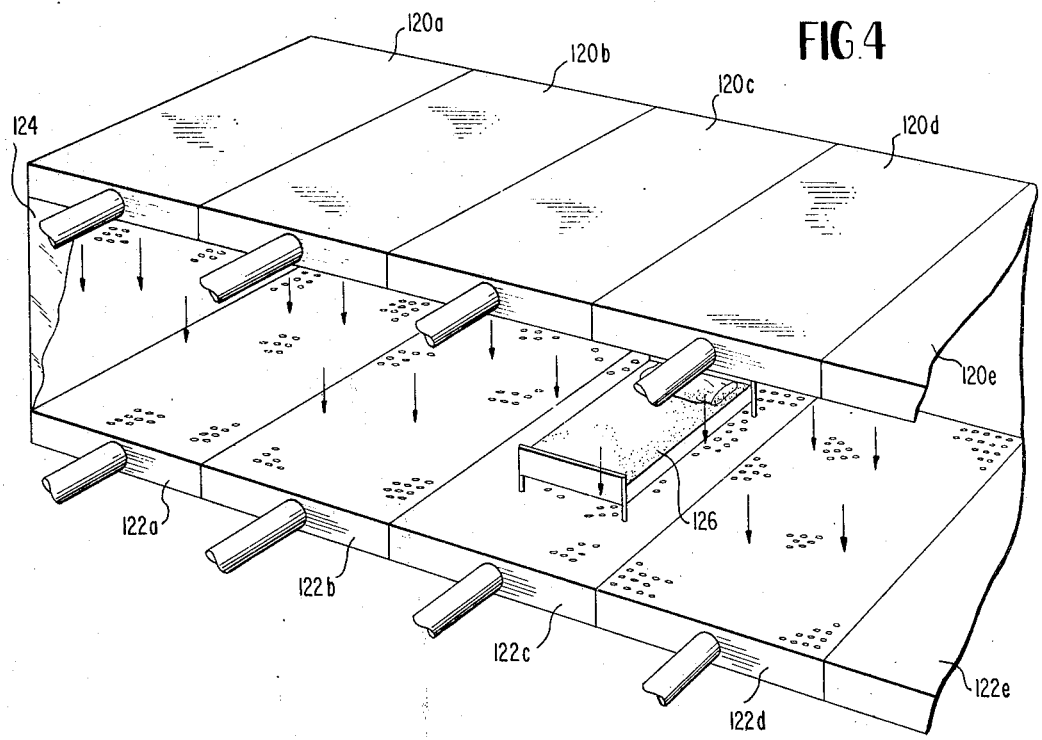

3,505,989
CONTROLLED ENVIRONMENTAL APPARATUS
Andrew Truhan, Somerset, N.J., assignor to Johnson & Johnson, a corporation of New Jersey
Filed May 29, 1967, Ser. No. 641,926
Int. Cl. F24f 7/06
U.S. Cl. 128—1                               7 Claims

ABSTRACT OF THE DISCLOSURE

An apparatus for providing a controlled environment in a localized area having an enclosure for isolating an area, an inlet and outlet plenum spaced from one another in the enclosure, a gas treating apparatus for treating and controlling the environmental conditions of gas passed therethrough, and conduiting to provide circulation of the atmosphere in the enclosure from the outlet plenum chamber through the gas treating apparatus to the inlet plenum chamber.

BACKGROUND OF THE INVENTION

This invention relates to an apparatus for controlling the environment in a localized area and more particularly to such an apparatus for providing a controlled environment unit such, for example, as a portable operating room, an intensive care unit or the like.

In the prior art, equipment for maintaining controlled environmental conditions has generally been of such bulk and complexity that it has heretofore been impossible to provide a close control of enviroment in temporary or portable structures, particularly the type used in combat or disaster areas.

SUMMARY OF THE INVENTION

This invention provides an apparatus which is self-contained and easily erected or dismantled and may, therefore, be readily transported for use as required. This is accomplished by providing a compact, self-contained unit through which the environmental gas may be scrubbed, filtered, sterilized, heated or cooled and de-humidified or humidified as required. The unit is combined with an easily erected enclosure and plenum arrangement by which the environment to be controlled is isolated.

This invention may find use in portable field operating rooms, areas for pre-operation preparation, isolation rooms in communicable disease units, animal operation rooms, and research areas where air sterilization and cleanliness are required. The device can be used separately other than for medical purposes, such for example, as sterile and clean areas for food, controlled atmosphere around conveyor systems, in the manufacturing of drugs, candies, foods, etc., and for controlling the environment in animal testing units.

Devices in accordance with the invention may also be ganged to provide control for the environment in large room systems.

Other objects and advantages of the invention are provided through an enclosure and conduiting communicative with a temperature, humidity and purity control device. The enclosure comprises a compartment having top, bottom and side walls and inlet and outlet plenum chambers having at least one gas permeable surface thereto. The gas treating apparatus comprises a gas treating chamber communicating at one end with the outlet plenum chamber and at the ohter end with the inlet plenum chamber, gas humidifying, cooling, heating, liquid removing, filtering and sterilizing means in said gas treating chamber; fan means for directing gas serially through the gas treating device, the inlet plenum chamber, and across the enclosure to the outlet plenum chamber.

BRIEF DESCRIPTION OF THE DRAWINGS

The invention will be particularly described with reference to the following detailed description of preferred embodiments of the invention when considered together with the attached drawing in which:

FIGURE 1 is a perspective view of a controlled environmental apparatus constructed in accordance with a teaching of this invention;

FIGURE 2 is a vertical sectional view through the enviromental gas treating apparatus of FIGURE 1;

FIGURE 3 is a perspective view of a variation of a portion of the apparatus in accordance with the invention; and FIGURE 4 is a perspective view of another variation of a portion of the invention.

DESCRIPTION OF THE PREFERRED EMBODIMENTS

Referring now to FIGURE 1 of the drawings, the apparatus comprises an enclosure shown generally at 10 and a wheel mounted gas treating device shown generally at 12. The gas treating device is communicative with the enclosure 10 through a feed conduit 14 and a return conduit 16. The conduits 14 and 16 are preferably of a flexible, helically reinforced type known in the art.

The closure 10 comprises a frame made up of vertical standards 18, horizontal members 20 and diagonal members 22 supporting side walls 24 and a top wall 26. The frame may be self-supporting or suspended from the ceiling of an enclosing structure as desired. The walls 24 and 26 are preferably formed of resilient, transparent plastic sheeting such, for example, as clear polyethylene film. A pervious wall 28 is horizontally disposed in the enclosure 10 in spaced relationship to the upper wall 26 and forms, in conjunction with the upper wall and upper portions of the side walls 24, an inlet plenum chamber 29. A bottom wall 30 is disposed across the bottom of the enclosure 10 to form a substantially airtight envelope therearound. Zippers 32 are provided at the juncture of a side wall 24, the pervious wall 28, the bottom wall 30 and the side walls 24 adjacent thereto, to provide access to the enclosure 10. Zippers may also be provided at the juncture of each of the aforedescribed walls to provide ease of storage and assembly and disassembly of the enclosure envelope, if so desired. A light fixture 34 is disposed in the upper wall 26 to provide means to supply lighting to the enclosure 10. Medicament addition means such, for example, as a medicament containing chamber 36, disposed on one of the walls 24, and a source of air, oxygen or other gas from a pressure tank 38, is provided to supply medicament to the enclosure 10, if required. An outlet plenum in the form of a perforaate tube 40 is disposed proximate the lower portion of the enclosure 10 and is communicative with the return conduit 16. The enclosure 10 is provided with a bed 42, preferably disposed over the perforate tube 40 as shown. While no particular structure for the pervious wall 28 or tube 40 is illustrated, film material, perforated with holes, for example, ¼ inch in diameter on ½ inch centers, can be utilized.

Referring now more particularly to FIGURE 2 of the drawings, the gas treating device 12 comprises a cabinet made up of double walled, insulation filled side panels 44 and 46, front and back panels 48 (FIGURE 1) and 50, and top and bottom panels 52 and 54 respectively. A refrigeration unit, shown generally at 56, is mounted in the lower part of the enclosure formed by the above-described walls and panels. An insulated panel 58 is disposed adjacent the refrigeration unit 56 to isolate the unit in conjunction with the aforedescribed walls.

A vertical interior wall 60 and a perforate horizontal wall 62 are arranged within the enclosure defined by the aforedescribed walls and panels to form therein a gas purifying chamber 64. A horizontal wall 66 is disposed superjacent the perforate wall 62 and in spaced relation thereto to define therewith a pre-treatment plenum chamber 68. The chamber 68 has disposed therein a heating coil 70 connected, through a control 72, to a suitable source of electric power (not shown). A temperature sensing device 74, located in the chamber 64, is connected to the control 72.

A transverse channel 76 is formed in conjunction with the horizontal wall 66, interconnects the plenum chamber 68 with the return conduit 16. A fan or blower 78 is disposed between the channel 76 and the return conduit 16 to circulate the gas as is shown by the arrows in the figure. A fitting means, illustrated as a door 80 (shown in phantom in FIGURE 2) is provided in the front wall 48 proximate the inlet of the return conduit 16 to supply make-up air to the gas circulation stream as needed. Although this fitting may be of any type suitable for the purpose, it is shown, for purposes of illustration as a horizontally hinged door, preferably spring loaded in the closed position.

A fluid holding tank 82 is located subjacent the channel 76 and is in communication therewith through openings 84 and 86. A valve means, illustrated as a movable flapper valve 88, is disposed in the channel 76 between the opening 84 and the opening 86 whereby a portion of gas stream passing along the channel 76 may be bypassed from a gas treating zone 90 in the tank 82 and recirculated directly to the plenum 68. This valve means provides additional control for the controlled environment device as will be described below.

Arranged in the tank 82 is a heater coil 92 connected to a suitable source of electric power (not shown) through a pair of manual circuit breakers 94, the heat output of which is governed by a control device 96 which is connected to a source of low voltage supply (not shown). A sensing element, which may comprise a thermister 98, is disposed in the tank 82 and is connected to the control 96. The coil 92 and sensing element 98 are submerged in a liquid sump 100 formed in the tank 82.

A cooling coil 102, connected to the refrigeration apparatus 56, is also submerged in the sump 100 to provide cooling for the fluid therein as required. The refrigeration unit 56 is also connected to the controls 96 in such a manner that, by suitable adjustment of the control device, heat may be added to the sump 100 through the heating coil 92, or removed therefrom through the cooling coil 102 to maintain a desired temperature therein. Devices suitable for achieving such control are standard in the art and, since the device per se does not constitute a portion of this invention, further detailed description thereof is not included herein.

An electric pump 104 communicates with a plurality of spray nozzles 106 disposed in the gas treatment zone 90 and with the liquid sump 100, whereby gas humidifying and temperature conditioning liquid is, in part, continuously recirculated.

Disposed in the chamber 64 are a plurality of filter units 108 which serve to filter impurities from the air circulated through the chamber 64 in the direction shown by the arrows. The filters may be of any type standard in the art, so long as they are capable of removing impurities and the droplets of liquid which may be suspended or entrained in the gas flowing therethrough. A plurality of gas purifying lamps, such, for example, as ultraviolet lamps 110 are disposed superjacent the filter units 108 and are connected to a suitable source of electric power (not shown). The feed conduit 14 communicates, through the upper wall 52, with the upper portion of the gas treatment chamber 64.

The aforedescribed insulated walls help reduce, to a minimum, heat transfer between the chamber 64 and the ambient atmosphere. Such insulation may be of any type standard in the art, such as foam polyurethane, glass wool or the like, or may comprise an evacuated area between the aforedescribed double walls.

While no particular form of perforate wall is illustrated, a hard board wall having ¼ inch diameter perforations on, for example, ½ inch centers, would provide satisfactory uniform gas flow through the chamber.

The heating coils 70 positioned in the plenum 68 are conventional electric coils connected to a suitable source of electric current through a thermostat means (not shown) whereby the temperature of the coils may be suitably adjusted and maintained to thereby finally adjust the temperature and humidity of the gas stream to the desired value immediately prior to entrance thereof into the chamber 64. This final adjustment provides means to closely control the properties of the gas flow.

In operation of the device, the temperature regulating controls 72 and 96 are energized. The pump 104 and fan 78 are then energized to initiate circulation of gas through the conduits 14 and 16 and liquid through the gas treating zone 90. Bypassed gas flowing through the gas treating zone 90 is saturated by the liquid spray from the nozzles 106 and is thereby humidified and simultaneously brought to a temperature condition proximate that in the sump 100. The gas stream is then passed through the plenum 68, through the heating coils 70, to finally adjust the temperature and the relative humidity of the gas stream to the value desired in the enclosure 10. By suitably controlling the quantity of gas stream which is to flow through the zone 90 and to become saturated at the predetermined temperature of the liquid in the sump 100, the relative humidity and the final temperature of the gas stream after passing the heating coils 70 is critically maintained. The gas stream then flows through the perforate wall 62 and is purified by filtration through the filter units 108 and exposure to the ultraviolet light from the lamps 110. The gas, fully conditioned and sterilized, then flows into the inlet conduit 14 and to the inlet plenum 29. The gas then flows downwardly through the perforations in the pervious wall 28 and uniformly across the enclosure formed between the walls 24 and into the perforate tube 40 to be withdrawn through the return conduit 16 and recycled through the treating device 12.

Where lights such as 34 and 110 are utilized, a certain amount of heat will be added to the gas stream during the cycling thereof. However, by suitably regulating the amount of heat added to the gas stream by the heating coils 70 and by having a substantial volume of gas flowing constantly through the enclosure, very uniform temperature and humidity may be obtained throughout the enclosure. Where the desired humidity and temperature cannot be fully maintained by the steps of saturating and heating the gas stream, the valve 88 may be adjusted to permit a predetermined portion of the air flowing in the channel from the inlet conduit 16 to recirculate through the heating coils 70. This bypassed, non-rehumidified air mixing with the gas stream flowing from the gas treating zone 90 provides a further measure of control for the chamber.

From the above description, it is obvious that the apparatus of this invention can be made readily portable and may be easily assembled, disassembled and stored in a relatively compact package for shipment. The connections for the members making up the frame are preferably of the snap or threaded fastener type so that the frame may be readily erected or dismantled. The flexible nature of the plastic film comprising the walls is such that it may be readily folded for storage or packing. The flexible conduits 14 and 16 provide a non-rigid connection between the gas treating device 12 and the enclosure 10, thereby allowing arrangement of the components in any required manner.

Once the closure 10 is erected, and the gas treating device 12 actuated in accordance with the above description, the environment in the enclosure 10 is continuously changed by a uniform flow of gas downwardly from the inlet plenum 29 to the lower portion and out through the perforate tube 40. Access to and from the enclosure 10 is achieved through the use of the zippers 32.

From the foregoing description of the preferred embodiments of the present invention, it can be seen that an improved device for maintaining controlled environment in a readily portable apparatus has been provided. Throughout the discussion of the preferred embodiments of the invention, the gas employed has been described as air, however, it will be apparent to those skilled in the art that, in a closed cycle device such as that disclosed herein, an inert atmosphere such as nitrogen may be maintained in the enclosure 10. Further, the gas may comprise a mixture of gases which may be high in oxygen, high in $CO_2$, high in CO and the like, without departing from the principles of the invention. Further, in addition to injecting water into the gas stream to provide a saturated gas, other liquid treating agents may be employed so that an atmosphere having a bactericidal or fungicidal property may be maintained in the enclosure 10.

It will be further recognized by those skilled in the art that, while specific controls for regulating the temperature of the coils 70 or the temperature of the heating and cooling coils 92 and 102 are not illustrated, a wide variety of commercial means including recorders may be employed with the gas treating device of the invention.

In addition to the aforedescribed embodiments, it should be understood that the configuration and applicability of the enclosure may be other than that specifically described. For example, referring to FIGURE 3, a configurational variation in accordance with the invention is illustrated. The inlet and return conduits 112 and 114 of this embodiment, corresponding to the inlet conduits 14 and 16 of the embodiment of FIGURE 1, communicate with an inlet plenum 116 disposed in spaced parallel relationship to a bed 118. As in the inlet plenum 29 of FIGURE 1, the lower surface of the plenum 116 is provided with perforations to disperse the gas flow therefrom. An outlet plenum 120, comprising perforate walls formed to correspond to the peripheral configuration of the bed 118, is communicative with the return conduit 114.

In addition to the aforedescribed utilization of the device in a relatively small or confined area, devices in accordance with the invention may also be applied to larger, more permanent installations wherein close control of the environmental conditions is desired. In such an instance, as shown in FIGURE 4 of the drawings, the apparatus may be ganged so that the inlet and outlet plenums 120a through 120e and 122a through 122e, disposed in opposed, ganged relationship as illustrated, form the ceiling and flood of an enclosure 124. With this arrangement, the rate of flow in the various zones formed between individual pairs of inlet and outlet chambers may also be varied, if required to maintain a variable level of environmental control. For example, in the area of the bed 126, where contamination of the gas flow is at its highest level or where control of the environment is most critical, the flow between the plenums 120c and 122c, supplying gas to this area of the enclosure 124, may be higher than the flow between the plenums adjacent thereto, 120b–122b and 120d–122d, while the flow between these plenums may be higher than the flow between the plenums next adjacent thereto, 120a–122a and 120e–122e, and so forth.

What has been set forth above is intended primarily as exemplary of a teaching in accordance with the invention to enable those skilled in the art in the practice thereof.

It should, therefore, be understood that, within the scope of the appended claims, the invention may be practiced other than as specifically desired.

What is new and therefore desired to be protected by Letters Patent of the United States is:

What is claimed is:

1. An apparatus for isolating a bed area from the surrounding environment, comprising: enclosure means for physically isolating said area; an inlet plenum coextensive with the upper portion of said enclosure means, said inlet plenum comprising a perforated lower wall horizontally positioned over said bed area so that purified gas may be uniformly directed downwardly into and across said area; an outlet plenum disposed proximate the lower portion of said enclosure means and adapted to have a bed positioned thereover; and gas circulating means for forcing purified gas into said inlet plenum and uniformly across said bed area and for withdrawing said gas through said outlet plenum.

2. The apparatus of claim 1 wherein said outlet plenum comprises a pervious tube having a diameter sufficiently small to permit location thereof under a standard hospital bed.

3. The apparatus of claim 1 wherein said outlet plenum comprises horizontal and vertical panels defining a rectangular chamber adapted to substantially fill the space beneath a standard hospital bed, at least said vertical panels being gas pervious.

4. Apparatus for isolating a plurality of adjacent bed areas in a single enclosure, comprising: a plurality of adjacent inlet plenums forming the ceiling of said enclosure; a plurality of outlet plenums vertically spaced from said inlet plenums and forming the floor of said enclosure, each of said outlet plenums having a substantially flat perforated upper surface corresponding in size and configuration to a vertically opposed inlet plenum to thereby form a plurality of bed areas and each of said outlet plenums being adapted to support a bed thereon; and gas circulating means for forcing purified gas into said inlet plenums and uniformly across each of said bed areas and for withdrawing said gas through said outlet plenums.

5. The apparatus of claim 4 further comprising means for varying the rate of flow of said gas across each of said bed areas.

6. A method of isolating adjacent bed areas within a single enclosure, comprising: dividing said enclosure into a plurality of bed areas, each of said areas having individually controlled means for forcing purified gas uniformly downwardly across said area and for withdrawing said gas from the lower portion of said area; and forcing purified gas across each of said areas at a desired rate of flow for each area.

7. The method of claim 6 wherein said gas is forced across each of said areas at a rate of flow different from the rate of flow across the next adjacent area.

References Cited

UNITED STATES PATENTS

| | | | |
|---|---|---|---|
| 2,288,538 | 6/1942 | Morrison | 128—191 XR |
| 2,390,693 | 12/1945 | Cohn | 128—191 |
| 2,502,263 | 3/1950 | Lewis | 128—191 XR |
| 2,624,333 | 1/1953 | Dixon et al. | 128—1 |
| 2,633,842 | 4/1953 | Higgs | 128—1 |
| 3,006,339 | 10/1961 | Smith | 128—191 |
| 3,283,520 | 11/1966 | Donohue et al. | 128—191 XR |
| 3,107,974 | 10/1963 | Potapenko. | |
| 3,151,929 | 10/1964 | Potapenko. | |
| 3,265,059 | 8/1966 | Matthews. | |
| 3,272,199 | 9/1966 | Matthews. | |

L. W. TRAPP, Primary Examiner

U.S. Cl. X.R.

98—36